US012692155B2

(12) United States Patent
Crete et al.

(10) Patent No.: US 12,692,155 B2
(45) Date of Patent: Jul. 28, 2026

(54) MAXIMIZING SYNGAS CARBON UTILIZATION AND CONVERSION TO BIOFUEL

(71) Applicant: ENERKEM INC., Montreal (CA)

(72) Inventors: Jean-Pierre Crete, Montreal (CA); Xeniya Savelyeva, Montreal (CA); Jérémie Gagnon, Montreal (CA); Louis Denomme, Montreal (CA); Maxime Banville, Montreal (CA); Maxime Foucault, Montreal (CA); Michel Chornet, Montreal (CA)

(73) Assignee: ENERKEM INC., Montreal (CA)

( * ) Notice: Subject to any disclaimer, the term of this patent is extended or adjusted under 35 U.S.C. 154(b) by 338 days.

(21) Appl. No.: 18/687,162

(22) PCT Filed: Aug. 26, 2022

(86) PCT No.: PCT/CA2022/051292

§ 371 (c)(1),
(2) Date: Feb. 27, 2024

(87) PCT Pub. No.: WO2023/023865

PCT Pub. Date: Mar. 2, 2023

(65) Prior Publication Data

US 2024/0359979 A1 Oct. 31, 2024

Related U.S. Application Data

(60) Provisional application No. 63/237,692, filed on Aug. 27, 2021.

(51) Int. Cl.
*C01B 13/02* (2006.01)
*C01B 3/02* (2006.01)
(Continued)

(52) U.S. Cl.
CPC .................. *C01B 3/52* (2013.01); *C01B 3/02* (2013.01); *C01B 32/40* (2017.08);
(Continued)

(58) Field of Classification Search
CPC .. C01B 3/52; C01B 3/02; C01B 32/40; C01B 2203/0415; C01B 2203/0475;
(Continued)

(56) References Cited

U.S. PATENT DOCUMENTS 4,957,515 A * 9/1990 Hegarty ............. B01D 53/1425
95/162
5,413,627 A * 5/1995 Landeck ................ B01D 53/14
423/220
(Continued)

FOREIGN PATENT DOCUMENTS

CA 1290553 C 10/1991

OTHER PUBLICATIONS

Office Action received Nov. 27, 2024 in corresponding Eurasian Application No. 202490570 (4 pages).
(Continued)

*Primary Examiner* — Frank M Lawrence, Jr.
(74) *Attorney, Agent, or Firm* — Greenberg Traurig, LLP; Melissa Hunter-Ensor; Scott Goncher

(57) ABSTRACT

It is provided a process for optimizing syngas carbon utilisation and syngas purity from a varying scrubbed syngas source before feeding into a syngas conversion unit comprising the steps of feeding a scrubbed syngas into a purification unit comprising at least one absorption unit to remove $CO_2$ from the scrubbed syngas, producing a clean $CO+H_2+CO_2$ syngas stream and a $CO_2$ rich stream; and mixing the clean $CO+H_2+CO_2$ syngas stream with hydrogen producing a balanced syngas stream, wherein the balanced
(Continued)

syngas stream meet the stoichiometric ratio and purity requirement of the syngas conversion unit.

19 Claims, 6 Drawing Sheets

(51) Int. Cl.
*C01B 3/52* (2006.01)
*C01B 32/40* (2017.01)
*C10K 3/06* (2006.01)

(52) U.S. Cl.
CPC ................. *C01B 2203/0415* (2013.01); *C01B 2203/0475* (2013.01); *C01B 2203/0485* (2013.01); *C01B 2210/0064* (2013.01)

(58) Field of Classification Search
CPC .... C01B 2203/0485; C01B 2210/0064; C01B 3/12; C01B 3/56; C01B 2203/0233; C01B 2203/042; C01B 2203/061; C01B 2203/062; C01B 2203/146; C01B 2203/86; B01D 53/1456; B01D 2256/16; B01D 2256/20; B01D 2257/304; B01D 2257/306; B01D 53/1475; B01D 2257/406; B01D 2257/408; C25B 1/04; C25B 15/00; C10G 2/32; C10J 3/00; C10K 1/004; C10K 1/005; C10K 1/08; C10K 1/085; C10K 1/32; C10K 3/026; C10K 3/06; C07C 29/1518; C07C 31/04; C07C 31/08; Y02C 20/40
USPC ... 95/90, 149, 187, 204, 206–208, 232, 235, 95/236; 423/220, 228, 229
See application file for complete search history.

(56) References Cited

U.S. PATENT DOCUMENTS

| | | | | |
|---|---|---|---|---|
| 7,799,834 | B2 | 9/2010 | Fraley | |
| 10,391,443 | B2 | 8/2019 | Meyer | |
| 2008/0223214 | A1 | 9/2008 | Palamara et al. | |
| 2022/0144634 | A1* | 5/2022 | Schmidt ............. | B01D 53/1406 |
| 2023/0321588 | A1* | 10/2023 | Schmidt ............. | B01D 53/1475 423/220 |
| 2024/0335786 | A1* | 10/2024 | Schmidt ............... | B01D 17/042 |

OTHER PUBLICATIONS

English translation of Office Action received Nov. 27, 2024 in corresponding Eurasian Application No. 202490570 (4 pages).
International Search Report and Written Opinion mailed Dec. 7, 2022 in corresponding International PCT Patent Application No. PCT/CA2022/051292 (9 pages).

* cited by examiner

MAXIMIZING SYNGAS CARBON UTILIZATION AND CONVERSION TO BIOFUEL

CROSS-REFERENCE TO RELATED APPLICATIONS

The present application is a U.S. National Phase, pursuant to 35 U.S.C. § 371, of International Application No. PCT/CA2022/051292, filed on Aug. 26, 2022 and claiming priority from U.S. Provisional Application No. 63/237,692 filed Aug. 27, 2021, the contents of which are hereby incorporated by reference in their entirety.

TECHNICAL FIELD

It is provided a process for optimizing syngas carbon utilisation, syngas purity and subsequent syngas conversion into downstream syngas conversion unit.

BACKGROUND

Methanol production from syngas is a well-known technology. Traditionally, such syngas has been produced from coal gasification, natural gas reforming or other fossil fuel gasification or catalytic and/or thermal reforming.

Syngas have also been documented to be produced from similar gasification and/or reforming technology using bio carbonaceous feedstock, such as biomass (e.g. wood, agricultural residues, or fast growing crops), plastic, biomass rich residues and/or waste. Syngas production has been used to produce alcohol (such as methanol, ethanol, and propanol), drop in fuel (e.g. hydrocarbon) and/or other chemicals (e.g. acetic acid, acrylic acid, or methyl acetate).

Several carbonaceous solid or liquid feedstock gasification and/or reforming technology end up generating a crude syngas streams with an $H_2/CO$ ratio lower than 2.0, which is required per stoichiometry for the production of methanol, alcohol and Fischer Tropsch. $H_2/CO$ ratio generated from these processes are often below 1.5 and even as low as 0.7 and below.

In coal or liquid fossil fuel gasification and/or reforming plants producing a crude syngas with an $H_2/CO$ lower than that required per the ratio derived from the stoichiometric reactions of the desired end product, a water gas shift reactor is typically included in the plant design to shift a portion of the excess CO into additional $H_2$ to rebalance the overall plant $H_2/CO$ ratio (per reaction 1 below). This water gas shift reactor also generate $CO_2$ as a by-product. Since the overall plant has an excess of $CO_2$, a process unit is required for $CO_2$ removal. Feedstocks also typically contain sulfur which are converted into reduced sulfur species ($H_2S$, COS, etc.) in the gasification and/or reforming units, such typical plant also contains an acid gas removal (AGR) unit that both remove $CO_2$ and sulfur species. Sulfur species are contaminants or poisons for several syngas conversion catalysts and also are undesired in most final chemical and/or fuel products.

$$CO + H_2O \longleftrightarrow CO_2 + H_2 \quad (1)$$

Depending on the specific catalyst and/or the desired final products, nitrogen contaminants such as HCN, $NH_3$ and/or amine must also be removed from the syngas. Such nitrogen contaminants can also be removed in the acid gas removal unit, with or without combination with other technology. Commercially available Cobalt based Fischer Tropsch catalyst is an example of catalyst that can only tolerate ultra-low level of such nitrogen contaminants; while also requiring to achieve ultralow sulfur contaminants level. Nitrogen contaminants removal from syngas can also benefit other syngas conversion technology, such as methanol or ethanol, to prevent trimethylamine (TMA) formation from the reaction of methanol with $NH_3$ and the subsequent additional purification effort to remove TMA from the final desired product.

In biomass, biomass rich or waste gasification and/or reforming valorization plant, such approach has the negative impact of losing valuable biogenic carbons via the carbon monoxide shift (equation 1), which does not end-up in the final biogenic product, but rather as excess $CO_2$ the plant has to either valorized as very low value merchant $CO_2$ and/or safely release to atmosphere after treatment and increase the green house impact of the plant. This also apply to plastic rich waste, waste (containing a significant non-bio fraction) or non-bio fossil derived waste gasification.

There is thus still a need to be provided with a process for minimizing lost in carbons (mostly as $CO_2$) and improving the yield via maximizing overall carbon syngas conversion, and by the same token the carbon feedstock conversion, to final desired product.

SUMMARY

It is provided a process for optimizing syngas carbon utilisation, syngas purity and subsequent syngas conversion into a downstream syngas conversion unit from a scrubbed syngas source comprising the steps of feeding a scrubbed syngas into a purification unit comprising at least one absorption unit to partially remove $CO_2$ from said scrubbed syngas, producing a clean syngas stream and a $CO_2$ rich stream; mixing the clean syngas stream with hydrogen producing a balanced syngas stream, wherein the balanced syngas stream meet the stoichiometric ratio requirement of the syngas conversion unit; and feeding said balanced syngas stream in said syngas conversion unit.

In an embodiment, the at least one absorption unit further removes sulfur species and produces an additional sulfur species rich stream.

In a further embodiment, the sulfur species is $H_2S$, COS, $CS_2$, or a combination thereof.

In another embodiment, the at least one absorption unit further removes nitrogen contaminant species, which are combined with the sulfur species rich stream or produces an additional nitrogen contaminant rich stream.

In an embodiment, the varying scrubbed syngas source comprises between 25 to 45 mol % of $H_2$, 30 to 65 mol % of CO and 6 to 40 mol % of $CO_2$ In a further embodiment, the clean syngas stream composition comprises 30% to 50 mol % $H_2$, 40 to 68 mol % CO and 0 to 25 mol % $CO_2$.

In a further embodiment, the carbon content ($CO_2$+CO) in the optimised carbon recovery balanced syngas allow to increase the scrubbed syngas carbon conversion to final desired product by more than 65%.

In an embodiment, the process described herein further comprises a step of recycling the $CO_2$ rich stream upstream of the purification unit, preferably into a gasification unit, for use as inerting gas, exporting said $CO_2$ rich stream for Carbon Capture and Storage (CCS), and/or producing saleable merchant $CO_2$ from said $CO_2$ rich stream.

In a particular embodiment, the purification unit is an acid gas removal unit (AGR) comprising a selective solvent for absorbing $CO_2$ and sulfur species from the scrubbed syngas in a absorption unit using said selective solvent, producing a loaded solvent and a clean syngas stream, withdrawing the loaded solvent through at least one recirculation loop, pre-flashing said loaded solvent at an intermediate pressure to recover absorbed $H_2$ and CO, producing a $CO_2$ stream rich in $H_2$ and CO and a flashed solvent steam, flashing the flashed solvent at lower pressure to recover $CO_2$, generating a non-flammable $CO_2$ rich stream and a second flashed solvent; and stripping the second flashed solvent in a first stripping unit to remove the sulfur species, producing a rich sulfur species stream and a clean solvent which is recycled back into the absorption unit.

In a further embodiment, a first portion of the loaded solvent is withdrawn through a first recirculation loop and a second portion of the loaded solvent is withdrawn through a second recirculation loop; the first portion of the loaded solvent is pre-flashed at an intermediate pressure recovering the $H_2$ and CO contained in the loaded solvent, producing a first $CO_2$ stream rich in $H_2$ and CO and a first flashed solvent, and the second portion of the loaded solvent is pre-flashed at an intermediate pressure recovering $H_2$ and CO contained in the loaded solvent, producing a second $CO_2$ stream rich in $H_2$ and CO and a second flashed solvent; the first flashed solvent is flashed at lower pressure generating a non-flammable $CO_2$ rich stream and a clean solvent which is recycled back into the absorption unit; the first and second $CO_2$ streams rich in $H_2$ and CO are recycled in the scrubbed syngas stream upstream of the absorption unit and the second flashed solvent is stripped in a stripping unit to remove sulfur contaminants (ex. $H_2S$, COS, etc), producing a $H_2S$ rich stream and a clean solvent which is recycled back into the absorption unit.

In another embodiment, the purification unit is an acid gas removal unit (AGR) comprising a selective solvent for absorbing $CO_2$, sulfur species and nitrogen species from the scrubbed syngas in the absorption unit using said selective solvent, producing a loaded solvent; and a clean syngas stream; withdrawing the loaded solvent through at least one recirculation loop; pre-flashing said loaded solvent at an intermediate pressure to recover absorbed $H_2$ and CO, producing a $CO_2$ stream rich in $H_2$ and CO and a flashed solvent steam; flashing the flashed solvent at lower pressure to recover $CO_2$, generating a non-flammable $CO_2$ rich stream and a second flash solvent; and stripping the second flash solvent in a stripping unit to remove the sulfur species, and nitrogen species, producing a rich sulfur and nitrogen species stream and a clean solvent which is recycled back into the absorption unit.

In another embodiment, a first portion of the loaded solvent is withdrawn through a first recirculation loop, a second portion of loaded solvent is withdrawn through a second recirculation loop, and a third portion of loaded solvent is withdrawn through a third recirculation loop where; the first portion of the loaded solvent is pre-flashed at an intermediate pressure recovering the $H_2$ and CO contained in the loaded solvent, producing a first $CO_2$ stream rich in $H_2$ and CO and a first flashed solvent; and the second portion of the loaded solvent is pre-flashed at an intermediate pressure recovering $H_2$ and CO contained in the loaded solvent, producing a second $CO_2$ stream rich in $H_2$ and CO and a second flashed solvent; and optionally, the third portion of the loaded solvent is pre-flashed at an intermediate pressure recovering the $H_2$ and CO contained in the loaded solvent, producing a third $CO_2$ stream rich in $H_2$ and CO and a third flashed solvent; the first flashed solvent is flashed at lower pressure generating a non-flammable $CO_2$ rich stream and a clean solvent which is recycled back into the absorption unit; the first, second and optional third $CO_2$ streams rich in $H_2$ and CO are recycled in the scrubbed syngas stream upstream of the absorption unit; and the second and third flashed solvents are stripped in a stripping unit to remove the sulfur species, and nitrogen species, producing a rich sulfur and nitrogen species stream and a clean solvent which is recycled back into the absorption unit.

In a further embodiment, a third portion of the loaded solvent is withdrawn through a third recirculation loop. The third portion of the loaded solvent is pre-flashed at an intermediate pressure recovering $H_2$ and CO contained in the third loaded solvent, producing a third $CO_2$ stream rich in $H_2$ and CO and a third flashed solvent. The third $CO_2$ stream rich in $H_2$ and CO is recycled in the scrubbed syngas stream upstream of the absorption unit. The third flashed solvent is stripped in the same stripping unit as the second flashed solvent to remove $NH_3$ and HCN, producing a $H_2S$, COS, $NH_3$ and/or HCN (i.e syngas contaminants) rich stream and a combined clean solvent which is recycled back into the absorption unit.

In a further embodiment, the third flashed solvent is stripped in a second separate stripping unit to remove $NH_3$ and/or HCN, producing a $NH_3$ and/and HCN rich stream.

In an embodiment, the first and/or the second stripping units are a thermal stripper to remove the sulfur and/or nitrogen species, producing a rich sulfur species gas stream, and/or a rich nitrogen species gas stream and clean solvents, wherein the clean solvents are recycled back into the at least one absorption unit.

In an embodiment, the stripping unit is a thermal stripper to remove the sulfur contaminants, producing a rich $H_2S$ and/or sulfur contaminants gas stream and a clean solvent, wherein the clean solvent is recycled back into the at least one absorption unit.

In an embodiment, the second stripping unit is a thermal stripper to remove the nitrogen contaminants, producing a rich $NH_3$ and/or HCN gas stream and a clean solvent, wherein the clean solvent is recycled back into the at least one absorption unit.

In another embodiment, the solvent loop flow rates and temperatures, and the pressures of the pre-flashing steps are adjusted to achieve the target $CO_2$ content in the final clean syngas stream.

In a further embodiment, the sulfur species is $H_2S$, COS, $CS_2$, or a combination thereof.

In a supplemental embodiment, the nitrogen contaminant species are HCN, $NH_3$, an amine, or a combination thereof.

In an embodiment, the scrubbed syngas sources have variables yield, flowrate and/or composition overtime.

In a further embodiment, the scrubbed syngas sources variability is due to the variable nature of heterogeneous waste biomass, waste and/or plastic waste feedstock.

In an embodiment, the clean solvent(s) is (are) cooled before being recycled back into the at least one absorption unit.

In another embodiment, the thermal stripper(s) comprises a column comprising a reboiler and a condenser.

In an embodiment, the non-flammable $CO_2$ rich stream is further used as inerting gas, recovered for Carbon Capture and Storage (CCS) and/or to produce saleable merchant $CO_2$.

In a supplemental embodiment, the process further comprises treating the clean syngas stream with at least one solid adsorbent bed before or after mixing the clean syngas stream with hydrogen.

In an embodiment, at least one adsorbent bed comprises an alumina based adsorbent for HCl and halogen removal, a ZnO based adsorbent for removal of HCl (and halogen) and $H_2S$, a Cu based adsorbent for removing COS, $CS_2$ and arsine, and an adsorbent for carbonyl removal.

In another embodiment, the absorption unit is a column comprising at least 3 mass transfer zone sections.

In further another embodiment, the absorption unit is a column comprising at least 4 mass transfer zone sections.

In a further embodiment, the mass transfer zone sections are comprised in separated columns.

In a further embodiment, the hydrogen is imported from an external source.

In an embodiment, the imported hydrogen is from a renewable source and/or a source of low carbon intensity.

In another embodiment, the imported hydrogen is from a water electrolysis with renewable power or low carbon intensity power, a biogas reforming or steam reforming, a low carbon intensity (CI) hydrogen source, or a low CI waste $H_2$ source.

In a particular embodiment, the purification unit or AGR comprises chilled methanol has a solvent.

In an embodiment, the pressure and temperature of pre-flashing is adjusted to achieve the target $CO_2$ content and recovery in the final clean syngas stream.

In a further embodiment, the balanced syngas stream meet the stoichiometric ratio requirement of the syngas conversion unit to produce fuel, a chemical, or a Fischer Tropsch product.

In another embodiment, the chemical or fuel is methanol or ethanol.

In an embodiment, the Fischer Tropsch product is diesel, kerosene, a jet fuel, or a naphtha or a mixture thereof.

In another embodiment, the clean syngas stream at the AGR achieves less than 100 ppbv, less than 10 ppbv, or alternatively less than 5 ppbv HCN and $NH_3$.

In an embodiment, the clean syngas stream at the AGR achieves less than 10 ppmv, less than 5 ppmv, less than 1 ppmv, or alternatively less than 0.1 ppmv of combined sulfur species.

In another embodiment, the clean syngas stream at the solid adsorbent bed achieves less than 10 ppbv, or alternatively less than 5 ppbv of sulfur species, of halogen species, of arsine, and/or of metal carbonyl.

In an embodiment, the halogen species are HCl, HF, HBr, or a combination thereof.

In a further embodiment, the metal is Ni, Fe, or a combination thereof.

In another embodiment, $H_2S$ concentration in the clean syngas stream is adjusted to achieves a specific desired concentration, to meet the requirement of the downstream syngas conversion unit; while achieving low level of HCN and/or $NH_3$ concentration.

In another embodiment, the $H_2S$ concentration in the clean syngas stream is maintained below 200 ppmv.

In another embodiment, the $H_2S$ concentration in the clean syngas stream is maintained below 100 ppmv.

In another embodiment, the process described herein further includes a reverse water gas shift (RWGS) unit to convert a portion of the recovered $CO_2$ along with a portion of the imported $H_2$ to generate additional carbon monoxide prior to the syngas conversion unit.

In a further embodiment, the additional CO production being mixed with a portion of the clean syngas to generate a boosted CO clean syngas.

In another embodiment, the $CO_2$ is recycled back to a carbonaceous feedstock gasification and/or reforming unit to reduce the scrubbed syngas $H_2$/CO ratio, increasing the total CO yield and production, and generating a boosted CO scrubbed syngas and a boosted CO clean syngas.

In an embodiment, the boosted CO clean syngas is mixed with hydrogen producing a balanced syngas stream, wherein the balanced syngas stream meet the stoichiometric ratio requirement of the syngas conversion unit.

In another embodiment, the syngas conversion unit converts in-situ $H_2$+CO and not $H_2$+$CO_2$.

In another embodiment, the process described herein further comprises admixing an external source of $CO_2$ or $CO_2$ input from another process effluent into the clean syngas stream along with the external source of hydrogen to produce a balanced syngas further boosted in carbon that meet the stoichiometric ratio of the desired end product, thus further increasing the production of the desired end product.

In an embodiment, the purification unit allows to achieve greater than 99% $H_2$+CO recovery in the clean syngas.

In a further embodiment, the scrubbed syngas is from a gasification and/or reforming of a carbonaceous material. Carbonaceous material refer to any gas, liquid or solid that contain a "Carbon" atom. In most cases, these atoms may be originated from plants or animals and their derivatives, or from fossil fuel and its derivative. As example of materials include, but not limited to, Municipal Solid Waste (MSW); Industrial, Commercial, and Institutional waste (IC&I); Construction and Demolition waste (C&D); any petroleum product; plastic; homogenous and/or non-homogeneous biomass.

In a particular embodiment, the carbonaceous material comprises a plastic, a metal, an inorganic salt, an organic compound, industrial wastes, recycling facilities rejects, automobile fluff, municipal solid waste, ICI waste, C&D waste, refuse derived fuel (RDF), solid recovered fuel, sewage sludge, used electrical transmission pole, railroad ties, wood, tire, synthetic textile, carpet, synthetic rubber, materials of fossil fuel origin, expended polystyrene, polyfilm floc, construction wood material, or any combination thereof. The method according to the invention is applicable in principle to any carbon-based material. It is immaterial here whether the fuel is a biogenic or non-biogenic fuel.

In a further embodiment, the carbonaceous material is a biomass, a biomass rich waste, a plastic rich waste or waste.

In another embodiment, the carbonaceous material is waste plastic, waste rubber, or tire rich waste feedstock.

In an embodiment, the additional source of $CO_2$, is recovered within the purification unit by adding a $CO_2$ recovery and purification unit to produce a high quality and/or ultra-clean $CO_2$ streams.

In a further embodiment, the $CO_2$ recovery and purification unit includes a primary and/or a secondary $CO_2$ columns, where medium quality $CO_2$ is produced in the primary $CO_2$ column, and/or high quality $CO_2$ is produced in the secondary $CO_2$ column.

In another embodiment, a portion or all of the $CO_2$ loaded solvent from the first recirculation loop is used as scrubbing medium in the primary and/or secondary $CO_2$ columns; the $CO_2$ and sulfur species loaded solvent from the second recirculation loop is fed at the bottom of the primary $CO_2$ column; $CO_2$ and sulfur species loaded solvent from the bottom of the primary $CO_2$ column is fed to the secondary $CO_2$ column; and the enriched sulfur species loaded solvent from the bottom of the secondary $CO_2$ column is fed to the stripping unit.

In an embodiment, the high quality $CO_2$ is further treated with a solid adsorbent to produce an ultra high $CO_2$ quality.

In an embodiment, the ultra high $CO_2$ quality is either admixed into the clean syngas stream along with the external source of hydrogen to produce a balanced syngas further boosted in carbon that meet the stoichiometric ratio of the desired end product, thus further increasing the production of the desired end product; sold off-site; and/or sent for storage.

In another embodiment, the produced ultra high $CO_2$ quality is sent, along with additional imported hydrogen, to a separate second syngas conversion unit that produces a desired end co-product from $H_2$ and $CO_2$.

In a further embodiment, the co-product syngas conversion unit is a methanol catalytic reactor, a Fischer Tropsch reactor using iron based catalyst, or an ethanol reactor using micro-organism bio-catalyst.

In an embodiment, the first syngas conversion unit can converts in-situ $H_2$ and CO and cannot convert $H_2$ and $CO_2$, into the desired end product.

In an embodiment, the purification unit comprises a stripping unit including a split loading stripper column with at least a top and bottom mass transfer zone sections, where nitrogen species loaded methanol is fed at the top of the stripper column and above the top mass transfer zone, while the sulfur species loaded methanol is fed in the middle of the stripper column in between the top and bottom mass transfer zone sections.

BRIEF DESCRIPTION OF THE DRAWINGS

Reference will now be made to the accompanying drawings.

FIG. 5 is also showing a configuration where the fourth mass transfer zone for $HCN/NH_3$ removal is installed in a separate column.

DETAILED DESCRIPTION

Figure 1:
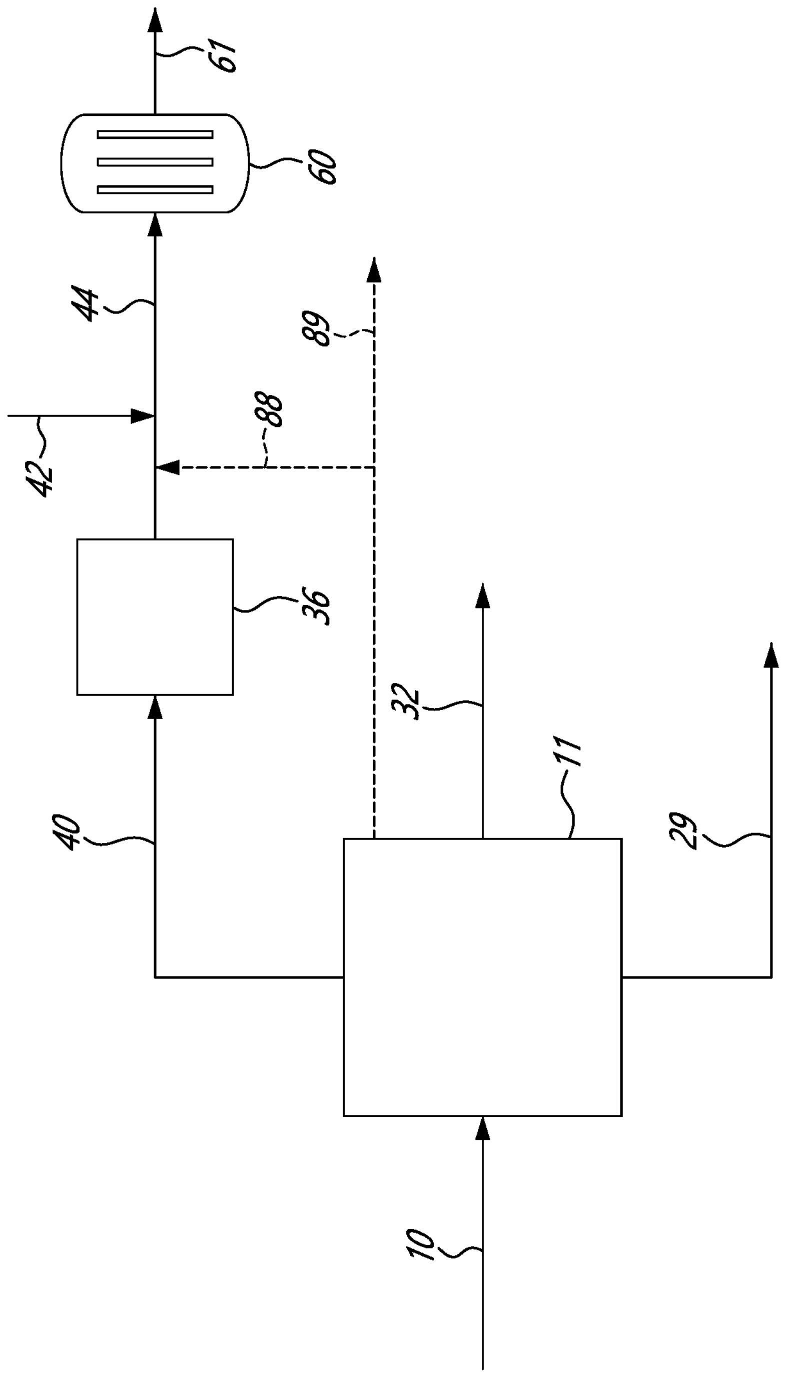
FIG. 1 illustrates a flow chart of the process described herein in accordance to an embodiment.

In accordance with the present disclosure, it is provided a process for optimizing syngas carbon utilisation, syngas purity and subsequent syngas conversion into downstream syngas conversion unit.

It is provided a method for maximising yield of syngas derived product (e.g. methanol) from gasification and/or reforming of variable carbonaceous feedstock composition when an external source of hydrogen, preferably a green, renewable or low carbon intensity hydrogen, is available.

It has been disclosed that rather than shifting excess CO to $H_2$ in a plant using carbonaceous feedstock, an external source of hydrogen could be imported into the plant and combined with the plant rich CO syngas to rebalance the overall plant $H_2/CO$ ratio to that required per the ratio derived from the stoichiometric reactions of the desired end product.

It is also known that some chemicals and fuel can be produced from the reaction of $H_2$ and CO, but also from $H_2$ and $CO_2$. One such product is methanol, but also Fischer Tropsch using iron based catalyst and ethanol using micro-organism bio-catalyst.

In most existing syngas to methanol plant, methanol is produced in a catalytic reactor per the following chemical reactions.

$$CO + 2H_2 \longleftrightarrow CH_3OH \quad (2)$$

$$CO_2 + H_2 \longleftrightarrow CO + H_2O \quad (3)$$

$$CO_2 + 3H_2 \longleftrightarrow CH_3OH + H_2O \quad (4)$$

It is understood and required that a minimum amount of $CO_2$ is needed in the syngas to the methanol reactor to obtain high methanol productivity and higher dry basis methanol purity (i.e. kg/hr Methanol per kg catalyst).

Typical modern syngas to methanol plant prepares a make-up syngas to be sent to a methanol reactor loop. In order to achieve high carbon efficiency (CO and $CO_2$ conversion to methanol), the make-up syngas must be balanced, i.e. any large excess of CO, $CO_2$ or $H_2$ would results in losses of valuable molecules via the reactor loop purge gas stream, as inevitably some non-condensable gases that act as inert/diluent (usually $N_2$, $CH_4$, etc.) must be purged from the system.

A fully balanced syngas would have a stoichiometric ratio or number (SN) of 2.0, leading theoretically to full conversion of $H_2$, CO and $CO_2$ to methanol as per above three reactions. Typically, a slight excess of $H_2$ is recommended, resulting in an SN slightly above 2.

$$SN = \frac{(H_2 - CO_2)}{(CO + CO_2)} \quad (5)$$

Since modern methanol reactor design and catalyst can also convert $CO_2$ with $H_2$ to methanol, carbonaceous rich feedstock gasification and/or reforming plants including an external source of hydrogen would benefit from a novel plant design as proposed herewith which would maximize carbonaceous feedstock derived CO and $CO_2$ recovery to achieve higher methanol yield.

Table 1 shows the range of $CO_2$ concentration in the make-up gas for a constant stoichiometric number (SN) of 2.04, ranging from no $CO_2$ (all methanol via equation 2) up to no CO (all methanol via net reaction 4). Accordingly, methanol can be produced from CO rich syngas to $CO_2$ rich syngas, and in any proportion in between.

TABLE 1

| CO$_2$ Concentration in Methanol Reactor Make-up Gas at constant SN | | | | |
|---|---|---|---|---|
| Syngas Composition (% v/v) - Main components | | | | |
| $H_2$ | CO | $CO_2$ | % Non-condensable and others ($N_2$, $CH_4$, etc.) | SN |
| 66.0% | 32.3% | 0.0% | 1.8% | 2.04 |
| 66.9% | 28.3% | 3.0% | 1.8% | 2.04 |
| 67.5% | 25.7% | 5.0% | 1.8% | 2.04 |
| 68.2% | 23.0% | 7.0% | 1.8% | 2.04 |
| 69.2% | 19.0% | 10.0% | 1.8% | 2.04 |
| 70.0% | 15.7% | 12.5% | 1.8% | 2.04 |
| 70.8% | 12.4% | 15.0% | 1.8% | 2.04 |
| 71.7% | 9.1% | 17.5% | 1.8% | 2.04 |
| 72.5% | 5.7% | 20.0% | 1.8% | 2.04 |
| 73.9% | 0.0% | 24.3% | 1.8% | 2.04 |

One of the challenges of waste, plastic rich waste, biomass and/or biomass rich gasification and/or reforming is the feedstock gasification/reforming composition variability overtime (weekly, monthly variations due to the variable nature of such feedstock), which impact the $H_2$, CO, $CO_2$ yield (flow rate) and contaminants concentration in the produced scrubbed syngas, i.e. the "varying scrubbed syngas source". The downstream units design, especially the purification unit, must then have the ability to manage variable syngas composition while maximizing CO and $CO_2$ recovery for maximum methanol or biofuel production while achieving target contaminants removal.

In an embodiment, the contaminants comprises, but are not limited to; sulfur species such as $H_2S$, COS and/or $CS_2$, nitrogen species such as HCN, $NH_3$ and/or amine, water and aromatics such as benzene, toluene and xylene. Nitrogen ($N_2$) is not a contaminant.

In a further embodiment, the purification unit is an acid gas removal unit (AGR) comprising a selective solvent for absorbing $CO_2$, sulfur contaminants (ex. $H_2S$, COS, and/or $CS_2$, etc), and nitrogen contaminants (ex. HCN, $NH_3$, and/or amine).

As described herein, the process provided for methanol production from a carbonaceous feedstock gasification and/or reforming also apply to other product which use methanol as intermediate and/or directly from syngas and/or other intermediate.

In an embodiment, the carbonaceous material/feedstock comprises a plastic, a metal, an inorganic salt, an organic compound, industrial wastes, recycling facilities rejects, automobile fluff, municipal solid waste, ICI waste, C&D waste, refuse derived fuel (RDF), solid recovered fuel, sewage sludge, used electrical transmission pole, railroad ties, wood, tire, synthetic textile, carpet, synthetic rubber, materials of fossil fuel origin, expended polystyrene, polyfilm floc, construction wood material, or any combination thereof. Accordingly, it is encompassed a process for methanol production from a carbonaceous feedstock gasification and/or reforming, such as e.g. a biomass, a biomass rich waste, a plastic rich waste and/or waste.

As depicted in FIG. 1, it is provided a process as described herein which involves maximizing the hydrogen, carbon monoxide and carbon dioxide recovery in the purification unit 11. Scrubbed syngas 10 is first feed to a purification unit 11 in order to optimize the $CO_2$ recovery in the purification unit 11 to maximise the $CO_2$ content in the clean syngas 40 leaving the purification unit 11. Imported hydrogen 42 is injected in the clean syngas 40 to prepare a balanced make-up syngas 44 to feed the catalytic syngas conversion unit 60 to produce the desired end product 61. A non-flammable $CO_2$ rich stream 32 is generated, which can be used as inerting gas up-stream in the plant. In addition, in an embodiment, a high quality $CO_2$ stream or ultraclean $CO_2$ stream (88) can be generated to optionally be mixed with the clean syngas stream 40 along with the external source of hydrogen 42 to produce a balanced syngas 44 further boosted in carbon that meet the stoichiometric ratio target for the desired end product, thus further increasing the production of the desired end product (see FIG. 5). Furthermore, in another embodiment, the ultraclean $CO_2$ can be sold off-site or send for storage (i.e. CCS) (stream 89). The process described herein allows removing the scrubbed syngas contaminants 29 in the purification unit 11.

Since the yield of $H_2$+CO over $CO_2$ in the varying scrubbed syngas source will vary over time, the AGR design and downstream syngas conversion unit must be designed to manage a range of syngas compositions, and must have the ability to adapt to such syngas yield variations while maximizing at all time the production within the plant and $H_2$ import capacity.

The syngas yield refer to the quantity of $H_2$, CO and $CO_2$ produced by the gasification/reforming unit per input quantity of carbonaceous feedstock fed to the gasification/reforming unit. Syngas yield variations imply that total syngas flowrate and composition, and thus individual $H_2$, CO and $CO_2$ flowrate, will vary overtime (weekly, monthly variations due to the variable nature of such feedstock).

Furthermore, downstream of the gasifier/reformer there are often steps of hot syngas quench, heat recovery and wet scrubbing using water as scrubbing medium. The wet scrubbed syngas then feed the AGR with or without a compression step. A COS hydrolysis to $H_2S$ unit may also be included before the AGR, which also typically catalyse HCN hydrolysis to $NH_3$.

It is thus provided a novel AGR design for processing the scrubbed syngas through an acid gas removal unit specially designed to manage variable scrubbed syngas yield and split it into different gas streams:

(i) a clean syngas stream with low sulfur contaminants concentration ($H_2S$, COS, and/or $CS_2$, but not limited to), and optionally low nitrogen contaminants concentration (HCN and/or $NH_3$, but not limited to).

(ii) rich syngas contaminants loaded gas streams (with sulfur species and/or HCN/$NH_3$);

(iii) low quality $CO_2$ stream(s) rich in $H_2$ and CO (recycled back to the syngas inlet of the AGR absorption column);

(iv) a non-flammable rich $CO_2$ stream (medium quality $CO_2$); and (v) optionally a high quality and/or ultra clean $CO_2$ stream.

The novel AGR design has operating handles that allow to maximise $H_2$ and CO recovery while adjusting the $CO_2$ recovery with variable inlet scrubbed syngas compositions to maximise methanol production.

Figure 2:
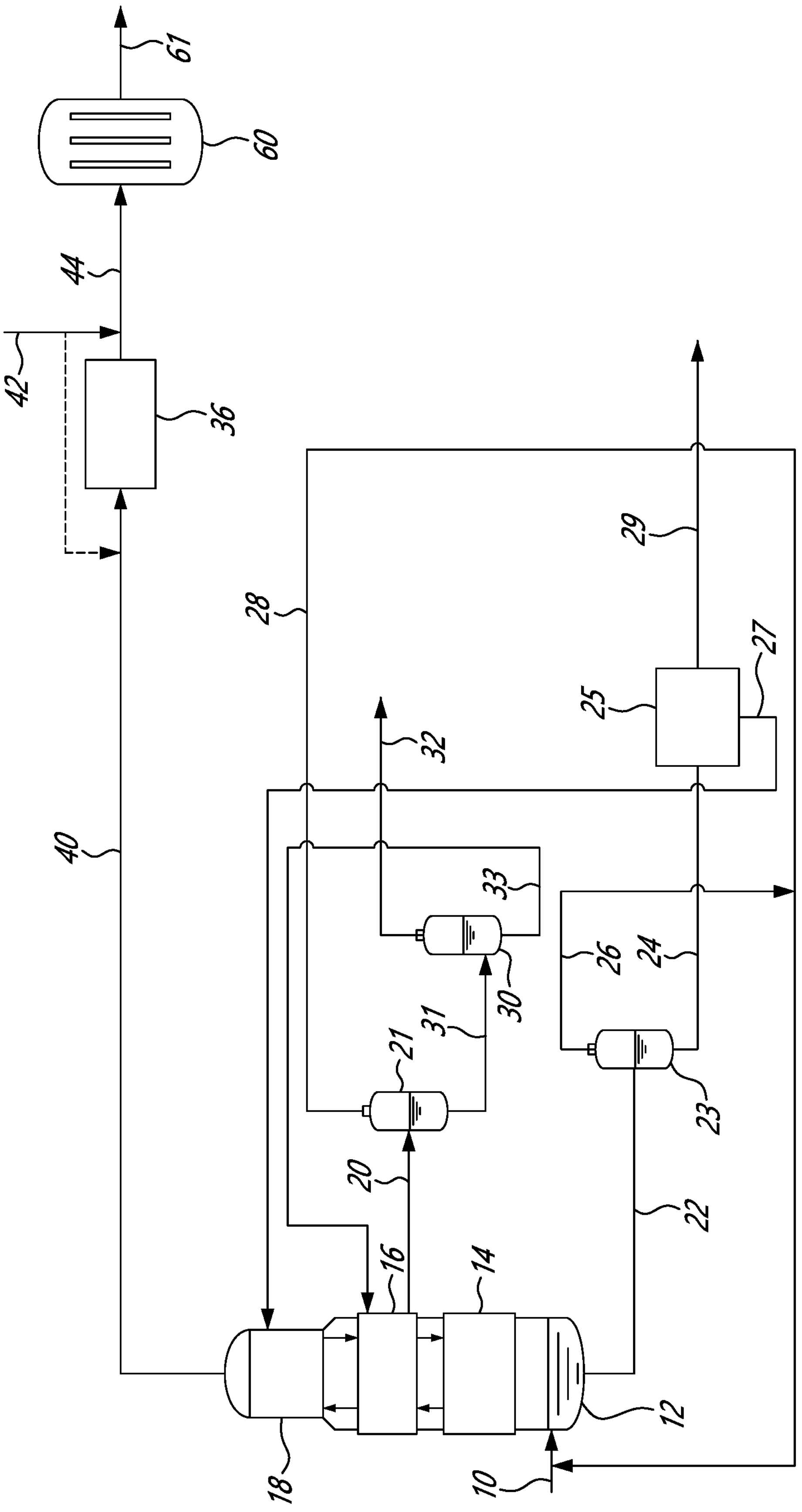
FIG. 2 illustrates a flow chart of the process described herein in accordance to an embodiment, including details of the purification unit.

As illustrated in FIG. 2, the scrubbed syngas 10 is first feed to an absorption column 12 using a solvent selective for $CO_2$ and $H_2S$ and other sulfur species. Such solvent can be for example but not limited to, chilled methanol.

The absorption column 12 has at least 3 mass transfer zone sections (example, but not limited to, trays, random packing and/or structured packing, namely the top 18, middle 16 and bottom section 14). The 3 mass transfer zone sections can be installed in one single column 12 with 3 sections or in 2 or 3 separate columns.

The loaded solvent still containing $H_2$ and CO passes through at least 2 recirculation loops around the absorber, the first loop 20 and the second loop 22. The second loop 22 is taken from the bottom section 14 and the first loop 20 is taken from the middle section 16 of the absorption column 12.

Both loops that withdraw solvent from the absorber sections, are pre-flashed (21, 23) at intermediate pressure to recover the valuable $H_2$ and CO absorbed in the solvent, thus producing two $CO_2$ streams rich in $H_2$ and CO—one 26 for the second loop 22 and one for the first loop 20 which are then combined and recycle up-stream of the absorption column 12, in the syngas feed 10. The recovered valuable $H_2$ and CO have another chance to pass through and leave the absorption column as part of the clean syngas 40 sent to the downstream catalytic reactor unit (60). Such pre-flash and recycle allow for more than 99% $H_2$+CO recovery in the overall AGR unit (i.e. Recovery=Quantity of $H_2$ and CO in stream 40 divided by the quantity of $H_2$ and CO in the inlet scrubbed syngas stream 10).

As a second step, the first loop solvent 20 is then further flashed 30 at lower pressure to generate a non-flammable $CO_2$ rich stream 32, which can be used as inerting gas up-stream in the plant. Alternatively, this $CO_2$ rich stream can be recovered for Carbon Capture and Storage (CCS) and/or to produce saleable merchant $CO_2$, with or without additional processing. The clean solvent is recycled back 33 into the absorption column 12.

As a second step, the pre-flashed second loop solvent 24 is then fed for regeneration to a thermal stripping unit 25 to remove the absorbed sulfur contaminants, thus producing a rich sulfur contaminants gas stream 29 and a clean regenerated solvent stream which is recycled back 27 at the top section 18 of the adsorber 12. The thermal stripping unit 25 can be a column with trays or packing equipped with either or both a reboiler and a condenser.

Figure 3:
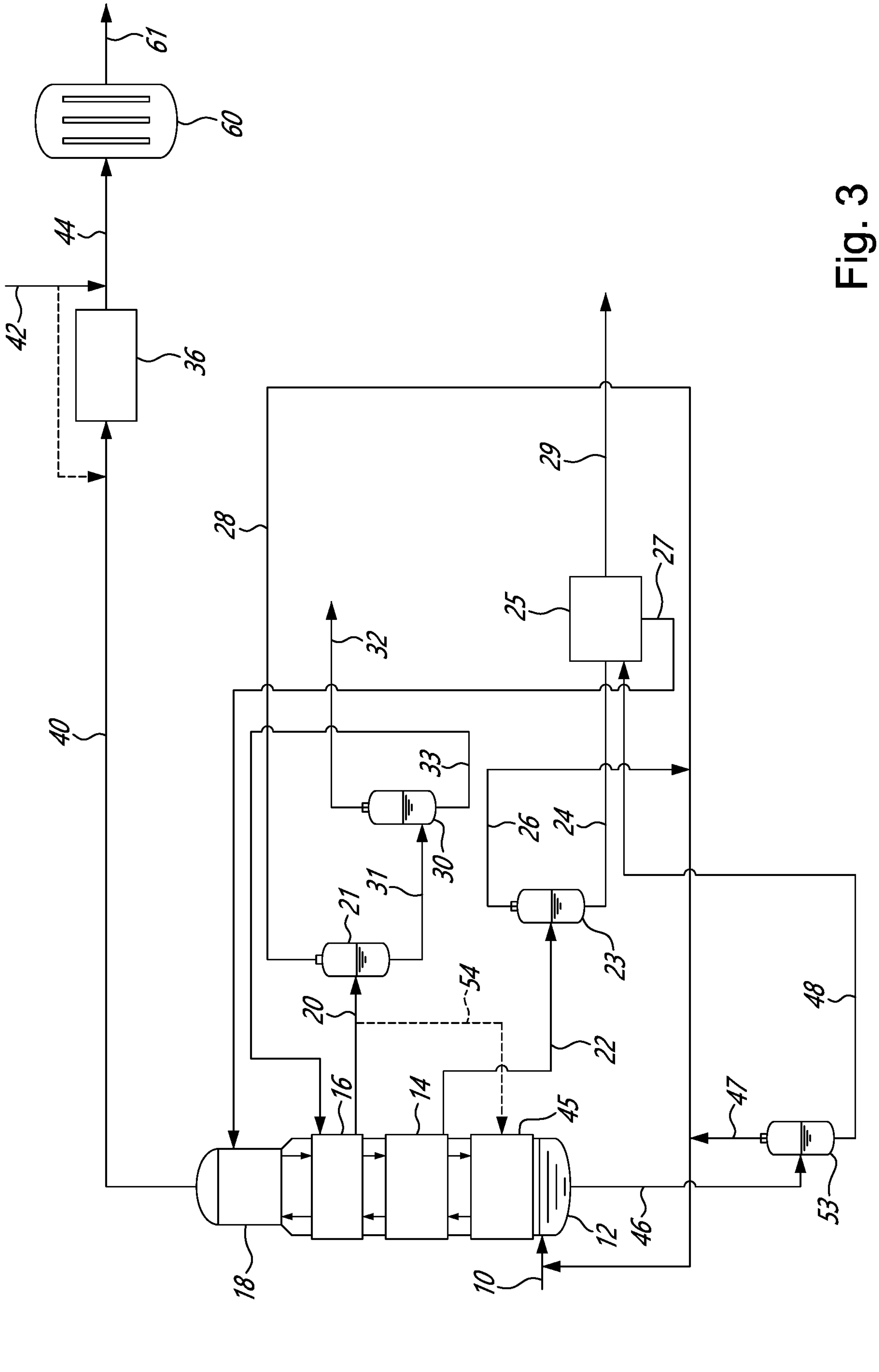
FIG. 3 illustrates a flow chart of the process described herein in accordance to an embodiment, including details of the purification unit and the option to achieve high removal efficiency of HCN and/or $NH_3$.
Figure 5:
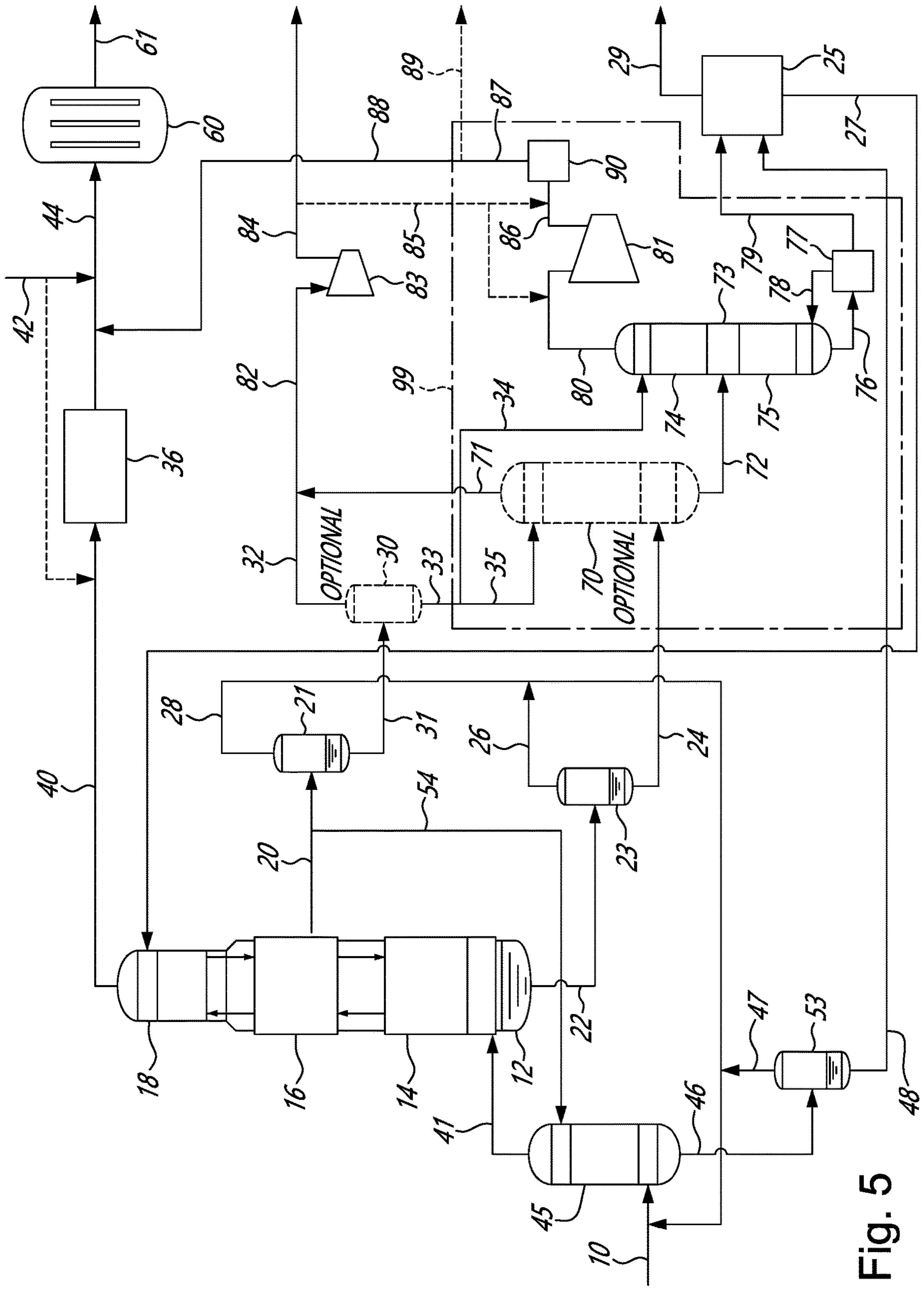
FIG. 5 illustrates a flow chart of the process described herein in accordance to an embodiment, including details of a $CO_2$ recovery and purification unit and an option to recover additional ultra-clean high quality $CO_2$ within the AGR.

As illustrated in FIG. 3, when required the purification unit can be fitted with a third recirculation loop (46) to increase $NH_3$ and HCN removal efficiency. The fourth mass transfer zone section 45 can be added in the main absorption column 12 (FIG. 3.) or installed in a separate column (FIG. 5). The third loop solvent 46 is pre-flashed at intermediate pressure 53 to recover the valuable $H_2$ and CO absorbed in the solvent, thus producing a $CO_2$ stream rich in $H_2$ and CO 47 which is then combined and recycle up-stream of the absorption column 12, in the syngas feed 10.

The pre-flashed third loop solvent 48 is then fed for regeneration to the thermal stripping unit 25 to remove the absorbed nitrogen contaminants, thus producing a rich sulfur species, $NH_3$ and HCN gas stream 29.

Figure 4:
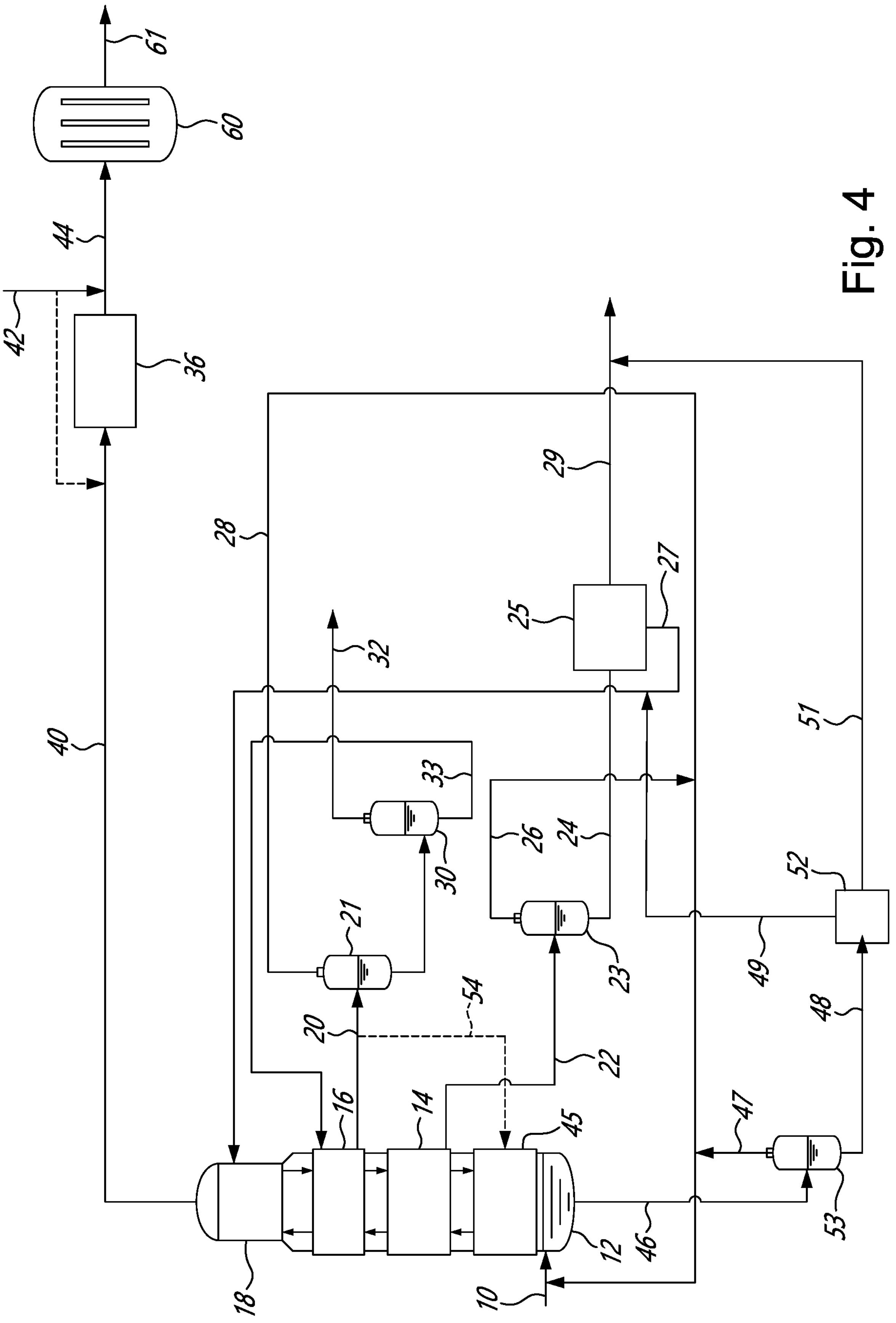
FIG. 4 illustrates a flow chart of the process described herein in accordance to an embodiment, including details of the purification unit and the option to achieve high removal efficiency of HCN and/or $NH_3$ with a second stripping unit.

Alternatively, as illustrated in FIG. 4, the pre-flashed third loop solvent 48 can be fed to a separate thermal stripping unit 52 to remove absorbed nitrogen contaminants, thus producing a rich $NH_3$ and HCN gas stream 51 and a clean solvent 49.

Alternatively, the solvent fed to the fourth mass transfer zone section 45 can be supplied partially or entirely from a slip stream 54 from the first solvent loop 20, as shown on FIGS. 3 and 4. In this configuration, the second solvent loop 22 can thus be either a total or partial liquid draw from the third mass transfer zone 14. When the fourth mass transfer zone section 45 is installed in a separated column, as in FIG. 5,

- the scrubbed syngas 10 is fed at the bottom of mass transfer zone section (53);
- solvent stream 54 taken from the first recirculation loop 20 is fed at the top of the fourth mass transfer zone section 45, and
- the pretreated gas 41 leaving the top of the fourth mass transfer zone section 45 is fed at the bottom of the absorber column 12 (bottom of the third mass transfer 14).

When low level of nitrogen species contaminants are present in the scrubbed syngas and thus requiring a lower third loop flowrate, the recoverable $H_2$+CO and $CO_2$ in the pre-flash step 53 will also be lower. As such, the extra project CAPEX to install step 53 may not be justified. In such a cases, the absorbed $H_2$+CO and $CO_2$ in third solvent loop 46 would be lost in the stripper vent stream 29 (FIG. 3) or 51 (FIG. 4).

The clean regenerated solvent 49 and 27 are taken respectively from stripping unit 52 (FIG. 4) and/or stripping unit 25 (FIGS. 2 and 3) and then cooled prior to be fed at the top section 18 of the adsorber 12 thus removing the final traces of sulfur and/or nitrogen contaminant from the syngas and thus producing a clean syngas stream 40 with low sulfur contaminants concentration (FIGS. 2, 3 and 4) and/or very low nitrogen contaminants concentration (FIGS. 3 and 4).

If required, to protect the downstream syngas conversion catalyst, the clean syngas stream 40 is further treated in a solid adsorbent bed 36 (before or after $H_2$ import addition 42), including a single or multiple adsorbent beds, in one or more parallel or/and in series vessel(s). Adsorbent may include alumina based adsorbent for removal of HCl and halogen, ZnO based adsorbent for removal of HCl, halogen and $H_2S$, a Cu based adsorbent for removing COS, $CS_2$ and Arsine, an adsorbent for carbonyl (Fe or Ni, or other) removal and/or adsorbent for HCN and/or $NH_3$ removal.

The clean syngas stream 40 is mixed with an external source of hydrogen 42 to produce a balanced syngas that meet the stoichiometric ratio requirement of the syngas conversion unit, thus producing an optimised carbon recovery balanced syngas 44.

The improved process of the present disclosure allow to produce an optimised carbon recovery balanced syngas which in turn allow to increase overall carbon scrubbed syngas and carbon feedstock conversion into the final desired product by more then 65% (as compared with the traditional approach of shifting the excess CO with water gas shift—WGS—and removing the excess $CO_2$), and even more then 140% depending on the initial scrubbed syngas composition (see Tables 2 and 3).

TABLE 2

Example composition of scrubbed syngas (10) and resulting improved process clean syngas composition (40)

| | | Scrubbed Syngas (10) | | | | Improved Process Clean Syngas (40) | | | |
|---|---|---|---|---|---|---|---|---|---|
| Scrubbed Syngas Case (10) | | #1 | #2 | #3 | #4 | #1 | #2 | #3 | #4 |
| Concentration\Configuration | | — | — | — | — | B | B | B | B |
| H2 | mol % | 27% | 31% | 43% | 32% | 33% | 38% | 47% | 33% |
| CO | mol % | 40% | 41% | 43% | 62% | 49% | 49% | 47% | 65% |
| CO2 | mol % | 31% | 26% | 14% | 6% | 16% | 10% | 5% | 1% |
| N2 | mol % | 1% | 1% | 1% | 0% | 2% | 2% | 1% | 1% |

TABLE 3

Improved process scrubbed syngas carbon recovery with $H_2$ import compared to traditional approach with WGS.

| | | Scrubbed Syngas (10) (Total 100 kmol/h basis) | | | | Traditional Approach with WGS - Balanced Syngas | | | | Improved Process with H2 import - Balanced Syngas (44) | | | |
|---|---|---|---|---|---|---|---|---|---|---|---|---|---|
| | | Scrubbed Syngas Case (10) | | | | | | | | | | | |
| Component flow\Configuration | | #1<br>— | #2<br>— | #3<br>— | #4<br>— | #1<br>A | #2<br>A | #3<br>A | #4<br>A | #1<br>B<br>(Note 1) | #2<br>B<br>(Note 1) | #3<br>B<br>(Note 1) | #4<br>B<br>(Note 1) |
| H2 | kmol/h | 27 | 31 | 43 | 32 | 47 | 50 | 60 | 66 | 119 | 107 | 100 | 127 |
| CO | kmol/h | 40 | 41 | 43 | 62 | 20 | 21 | 25 | 28 | 40 | 40 | 42 | 62 |
| CO2 | kmol/h | 31 | 26 | 14 | 6 | 2 | 2 | 3 | 3 | 13 | 8 | 5 | 0.5 |
| N2 | kmol/h | 1 | 1 | 1 | 0 | 1 | 1 | 1 | 0 | 1 | 1 | 1 | 0.5 |
| S.N. = (H2 − CO2)/(CO + CO2) | — | −0.06 | 0.08 | 0.51 | 0.38 | 2.04 | 2.04 | 2.04 | 2.04 | 2.04 | 2.04 | 2.04 | 2.04 |
| Carbon Syngas Recovery | % | Ref. | Ref. | Ref. | Ref. | 31% | 35% | 49% | 45% | 73% | 73% | 83% | 92% |
| % Increase Carbon Syngas Recovery | % | — | — | — | — | Ref. | Ref. | Ref. | Ref. | 138% | 105% | 69% | 102% |

(Note 1)
Configuration B without the third recirculation loop (46), and thus without also the fourth mass transfer zone section 45 and flash steps 53

For methanol production, the balanced syngas would have an optimal stoichiometric ratio (SN) slightly above 2, as explain before. Although, it can also operate at lower or higher stoichiometric ratio. Other syngas conversion units or technology to obtain different end products may have different target stoichiometric ratio equations and/or values.

In an embodiment, the imported/external source of hydrogen 42 is from a renewable source and/or a source of low carbon intensity.

In an additional embodiment, the imported source of hydrogen 42 is from a water electrolysis with renewable power or low carbon intensity (CI) power, a biogas reforming or steam reforming, a low carbon intensity (CI) hydrogen source, or a low CI waste $H_2$ source.

Finally, the optimised carbon recovery balanced syngas 44 is feed to a syngas conversion unit 60 (syngas conversion reaction system), thus producing an optimised carbon content fuel and/or chemical as desired end product (61).

Considering that the downstream syngas conversion unit 60 will be designed with a maximum capacity and/or that the $H_2$ import 42 will also have a maximum supply capacity, to maximize plant profitability with varying scrubbed syngas composition and yield, design and operating handles have to be provided to maximize at all time the biofuel production and profitability.

At lower $H_2$+CO yield in the scrubbed syngas, higher AGR $CO_2$ recovery will be required to maintain the plant at is maximum methanol capacity and up to the availability of import hydrogen, since per reaction 3 more $H_2$ is required for conversion to methanol from $CO_2$.

At higher $H_2$+CO yield in the scrubbed syngas, lower AGR $CO_2$ recovery will be required to maintain the plant at is maximum methanol capacity, while minimizing $H_2$ import and thus variable operating costs.

In the provided AGR design, the AGR include the following design and operation handles to optimize the $CO_2$ recovery to maintain the plant at its maximum methanol capacity and optimal hydrogen usage.

The first 20 and second loops 22 flow rates and/or temperature are adjusted to achieve the target $CO_2$ content and low reduced sulfur content in the final clean syngas stream (40), and/or, The pre-flash pressures of the first and/or second loops (21 and 23 respectively) are further optimised and the generated $CO_2$ streams (28 and 26 respectively) are recycle up-stream of the AGR to maximise $CO_2$ recovery in the final clean syngas stream (40).

The pressure of the first loop 20 low pressure flash 30 can be adjusted to optimize $CO_2$ recovery to achieve the exact required quantity of non-flammable rich $CO_2$ stream 32, and thus keeping the balance of the $CO_2$ in the clean syngas 40 leaving the AGR 12.

When high HCN and/or $NH_3$ removal level are required with FIG. 3 or 4 configurations, the AGR design further include the following design and operation handles to optimize the $CO_2$ recovery:

a third recirculation loop 46 flow rates and/or temperature are adjusted to achieve the target $CO_2$ content and low reduced nitrogen species content in the final clean syngas stream (40), and/or, the pre-flash pressures of third loop (53) is further optimised and the generated $CO_2$ stream (47) is recycled up-stream of the AGR to maximise $CO_2$ recovery in the final clean syngas stream (40).

As exemplified herein, syngas production for methanol production have been used as an example. However, it can be applied with any syngas conversion process to chemical and fuel, that can be produced from $H_2$ and $CO_2$ in addition to $H_2$ and CO, i.e. Fischer Tropsch using iron based catalyst and ethanol using micro-organism bio-catalyst, etc. but not limited to. Desired Fischer Tropsch products, include fuels such as diesel, kerosene/jet fuel and/or naphtha following crude Fischer Tropsch products refining or upgrading, but also waxes, base oil, etc.

Methanol can also be used as an intermediate product. When first produced, it can be further converted to olefins (propylene and ethylene), formaldehyde, gasoline, naphtha, kerosene, aviation fuel, and/or diesel. Ethanol can be used as a fuel or as intermediate product, for example for ethylene production via dehydration.

In addition, the objective of maximizing syngas derived product yield with syngas $CO_2$ recovery and an external $H_2$ import from biomass rich feedstock, is also applicable to any carbonaceous feedstock with the objective to either maximise yield and production and/or reduce $CO_2$ green house gases (GHG) emissions. For example, plastic rich waste, waste rubber and tire, etc. chemical recycle via gasification process would also benefit of this novel AGR design by maximizing the total feedstock carbon conversion to the desired final product, thus minimizing the plant $CO_2$ GHG emission. More specifically, olefins production from methanol or ethanol can be used for plastic production, thus closing the circular loop when using plastic rich waste as gasification feedstock.

In an embodiment, the clean syngas stream 40 at the outlet of the AGR absorber achieves less than 100 ppbv, less than 10 ppbv, or alternatively less than 5 ppbv HCN and $NH_3$.

In another embodiment, the clean syngas stream 40 at the outlet of the AGR absorber achieves less than 10 ppmv, less than 5 ppmv, less than 1 ppmv, or alternatively less than 0.1 ppmv of combined sulfur species.

In another embodiment, the clean syngas stream at the outlet of the solid adsorbent bed 36 achieves less than 10 ppbv, or alternatively less than 5 ppbv of sulfur species, of halogen species (ex. HCl, HF, HBr, etc.), of arsine, and/or of metal (ex. Ni and/or Fe) carbonyl.

In another embodiment, the $H_2S$ concentration in the clean syngas stream 40 at the outlet of the AGR absorber can be adjusted to achieves a specific higher desired concentration to meet the requirement of the downstream syngas conversion unit; while achieving low level of HCN and/or $NH_3$. This functionality is of special interest when using micro-organism syngas conversion technology (60) for which some $H_2S$ is required to maintain the micro-organism activities, while HCN is a well-known poison. In such case, the $H_2S$ concentration in the clean syngas stream 40 at the outlet of the AGR absorber can be maintained below 200 ppmv, alternatively below 100 ppmv, while achieving low level of HCN and/or $NH_3$. Reducing the $H_2S$ removal requirement, allow to reduce the flowrate and/or stripping unit (25) duty of the second recirculation loop 22, reduce the inherent loss of $CO_2$ with the rich sulfur contaminants gas stream 29, thus increase the $CO_2$ recovery and concentration in the clean syngas 40 and producing a further optimised carbon content fuel and/or chemical as desired end product (61).

In another embodiment, this novel AGR design can also be used to fully removed the $CO_2$ from the scrubbed syngas 10 to produce an ultra-low $CO_2$ concentration clean syngas 40 or to achieve a specific lower $CO_2$ concentration in the clean syngas 40. With such objective, the recirculation loops pre-flash pressure are optimised to reduce $CO_2$ flash (and recycle back to the absorber), while still achieving the targe $H_2$ and CO recovery. The recirculation loops flow rate are increased to achieve higher $CO_2$ removal. Such flexible design is especially of interest for plant design when $H_2$ import is not available, and/or for syngas conversion technology that cannot make the desired end-product with $CO_2$+$H_2$.

In another embodiment, an external source of $CO_2$ or $CO_2$ input from another process effluent can be mixed with the clean syngas stream 40 along with the external source of hydrogen 42 to produce a balanced syngas 44 further boosted in carbon that meet the stoichiometric ratio target for the desired end product, thus further increasing the production of the desired end product. The flow of the external source of hydrogen (42) must be increased accordingly. Alternatively, if this additional $CO_2$ sources require cleaning, it could be fed to the AGR inlet.

Such $CO_2$ sources from another part of the process can be the unrecovered $CO_2$ lost in the rich sulfur stream (29) and/or nitrogen species rich stream (51). As such, to recover the $CO_2$ from this waste stream for catalytic synthesis, additional treatment units would be required to reduce contaminants down to ultra-low level. Such additional treatment units includes, but not limited to, additional absorption/stripping technology, solid adsorbent technologies, etc.

In another embodiment, additional ultra-clean high quality $CO_2$ can be recovered by adding a $CO_2$ recovery and purification unit (99) within the AGR as shown in FIG. 5.

In such configuration, the $CO_2$ loaded methanol (33), rather than being recycled to the AGR absorber (12), a portion (35) is sent to the top of a primary $CO_2$ column (70), which include at least one mass transfer zone. In addition, the $CO_2$ and sulfur species loaded methanol (24) is sent to the bottom of the primary $CO_2$ column (70). In the primary $CO_2$ column, the low sulfur $CO_2$ loaded methanol 35 acts as a scrubbing medium to keep the sulfur species down the column, while recovering a $2^{nd}$ medium quality $CO_2$ (71) from both loaded methanol streams. The primary $CO_2$ columns also remove additional non-condensable gas (ex. CO and $H_2$) from the bottom of the column, which further contributes to achieve ultra-low CO specifications in high quality $CO_2$ (stream 80).

The $1^{st}$ recovered medium quality $CO_2$ stream is in fact stream 32 as described earlier. Both medium quality $CO_2$ streams (32 and 71) are combined into stream 82, which meet the non-flammable quality criteria as described earlier. Optionally, they are compressed in a compressor (83) for use as inert gas in the plant front end feed system or other uses, as described earlier.

The bottom $CO_2$ and sulfur species loaded methanol (72) is fed to the secondary $CO_2$ column (73) in between its 2 mass transfer zones (74 and 75). The balance of the $CO_2$ loaded methanol (34), is fed to the top of the column and acts as a scrubbing medium to keep the sulfur species and other contaminants down the secondary $CO_2$ column (73), while recovering a high quality $CO_2$ stream (80) from both $CO_2$ and sulfur species loaded methanol (72) and the balance of the $CO_2$ loaded methanol (34). At the bottom of the secondary $CO_2$ column (73) the enriched sulfur species loaded methanol (76) is sent to a $CO_2$ flash unit (77) to maximize $CO_2$ recovery from the bottom enriched sulfur species loaded methanol (76).

The $CO_2$ flash unit (77) include a combination of low pressure flash with flash gas recompression and/or thermal heating assisted pressurized flash. The flash $CO_2$ rich streams (78) are returned at the bottom of the secondary $CO_2$ column (73).

The enriched sulfur species loaded methanol (79) is taken from the $CO_2$ flash unit (77) and then sent to the AGR stripping unit (25). The nitrogen species loaded methanol (48) is either sent directly to the AGR stripping unit (25) or could be incorporated into the $CO_2$ recovery and purification unit 99 to recover its small $CO_2$ content. The AGR stripping unit 25 regenerate both loaded methanol into a lean methanol (27), which is recycled at the top of the AGR absorber (12) section (18), as described earlier. The resulting AGR sulfur and/or nitrogen species waste gas stream (29) is thus further enriched in sulfur and nitrogen species, and thus results in lower loss of carbon (as $CO_2$) out of the process.

The recovered high quality $CO_2$ stream (80), is then, if required, compressed to higher pressure in a compressor (81). Depending on the required high quality $CO_2$ target specification it can then be treated in a solid phase absorbent unit (90) to remove remaining contaminants down to ultra-low ppm or ppb level as described before for the clean syngas guard beds (36). The produced ultraclean $CO_2$ stream (87, 88) can then be mixed with the clean syngas stream 40 along with the external source of hydrogen 42 to produce a balanced syngas 44 further boosted in carbon that meet the stoichiometric ratio target for the desired end product, thus further increasing the production of the desired end product. The flow of the external source of hydrogen (42) must be increased accordingly, as described earlier.

Table 4 below show that additional $CO_2$ recovery and yield increase with this additional functionality to the AGR.

hydrogen (42). For different reasons, a specific project and plant location may have limited access to imported hydrogen. As such, one of the important feature of this invention is that each project can decide to include all or only part of the described features herein to achieve the specific requirements of the project and minimize the project profitability and/or environmental foot print.

If lower quality $CO_2$ are required, the flash step 30 can be omitted, and thus first loop 31 would be split in 2 (34 and 35), rather than stream 33, to feed the primary (70) and secondary (73) $CO_2$ columns. In that configuration, all the medium $CO_2$ quality would be supplied from the primary $CO_2$ column via stream 71. Alternatively, the primary $CO_2$ column could be omitted if lower $CO_2$ quality is required. In that configuration, the $CO_2$ loaded methanol (33) is fed directly at the top of the secondary $CO_2$ columns (73), and the $CO_2$ and sulfur species loaded methanol (24) is fed directly to the secondary $CO_2$ column (73) in between its 2 mass transfer zones (74 and 75).

In another embodiment, if limited hydrogen supply is available, or the desired end product synthesis catalyst and unit (60) cannot convert the recovered ultraclean $CO_2$ (87) into additional desired product, the ultraclean $CO_2$ can be sold off-site or send for storage (i.e. CCS) (stream 89).

Alternatively, when the desired end product synthesis catalyst and unit (60) cannot convert the recovered ultra-clean $CO_2$ (87) into additional desired product, the ultra-clean $CO_2$ could be sent (stream 89) to a methanol reactor along with additional imported hydrogen to co-produce methanol in the plant. Alternative to methanol co-production are any technology that can convert $CO_2$+$H_2$ to a desired end product, as described before.

In another embodiment, any excess (85) of medium quality $CO_2$ (84) could be mixed with the high quality $CO_2$ (86), to further maximize desired end-product yield and production.

TABLE 4

Improved process scrubbed syngas carbon recovery with CO2 Recovery and Purification unit and with $H_2$ import compared to traditional approach with WGS.

| | | Scrubbed Syngas (10) (Total 100 kmol/h basis) | | Traditional Approach with WGS - Balanced Syngas | | Improved Process with H2 Import - Balanced Syngas (44) | | Improved Process with CO2 Recovery and Purification Unit (99) - Balanced Syngas (44) | |
|---|---|---|---|---|---|---|---|---|---|
| | | Scrubbed Syngas Case (10) | | | | | | | |
| | | #1 | #2 | #1 | #2 | #1 | #2 | #1 | #2 |
| Component flow\Configuration. | | — | — | A | A | B (Note 1) | B (Note 1) | C (Note 1, 2) | C (Note 1, 2) |
| H2 | kmol/h | 27 | 31 | 47 | 50 | 119 | 107 | 147 | 128 |
| CO | kmol/h | 40 | 41 | 20 | 21 | 40 | 40 | 40 | 40 |
| CO2 | kmol/h | 31 | 26 | 2 | 2 | 13 | 8 | 22 | 15 |
| N2 | kmol/h | 1 | 1 | 1 | 1 | 1 | 1 | 1 | 1 |
| S.N. = (H2 − CO2)/(CO + CO2) | — | −0.06 | 0.08 | 2.04 | 2.04 | 2.04 | 2.04 | 2.04 | 2.04 |
| Carbon Syngas Recovery | % | Ref. | Ref. | 31% | 35% | 73% | 73% | 86% | 83% |
| % Increase Carbon Syngas Recovery | % | — | — | Ref. | Ref. | 138% | 105% | 178% | 134% |

(Note 1)
Configuration B and C without the third recirculation loop (46), and thus without also the fourth mass transfer zone section 45 and flash steps 53
(Note 2)
Configuration C without optional first solvent circulation loop flash steps 30

For sure, such additional $CO_2$ recovery and desired product yield increase require availability for additional imported When a $CO_2$ recovery and purification unit (99) is included in the AGR configurations, the AGR design further include the following design and operation handles to optimize the $CO_2$ recovery from the variable scrubbed syngas source:

The first 20 and second loops 22 flow rates and/or temperature are adjusted to achieve the target $CO_2$ content and low sulfur content in the final clean syngas stream (40), and/or, the target recovery of high purity $CO_2$ (87).

The pre-flash pressures of the first and/or second loops (21 and 23 respectively) are further optimised and the generated $CO_2$ streams (28 and 26 respectively) are recycle up-stream of the AGR to balance the desired $CO_2$ recovery in the final clean syngas stream (40) versus the recovery of high purity and/or ultraclean $CO_2$ (87).

The pressure of the first loop 20 and low pressure flash 30 can be used to reduce the CO content in the high quality $CO_2$ (80).

The $CO_2$ flash unit (77) pressure and/or temperature can be adjusted to achieve the desired high purity $CO_2$ (87).

In another embodiment, the AGR stripping unit (25) is a split loading nitrogen and sulfur species stripping unit design, rather than a standard configuration stripper where the combined contaminants loaded solvents are sent at the top of the stripper to be stripped off their contaminants as the solvents flow down to the bottom of the stripper to generate a regenerated solvent at the bottom of the stripper.

Figure 6:
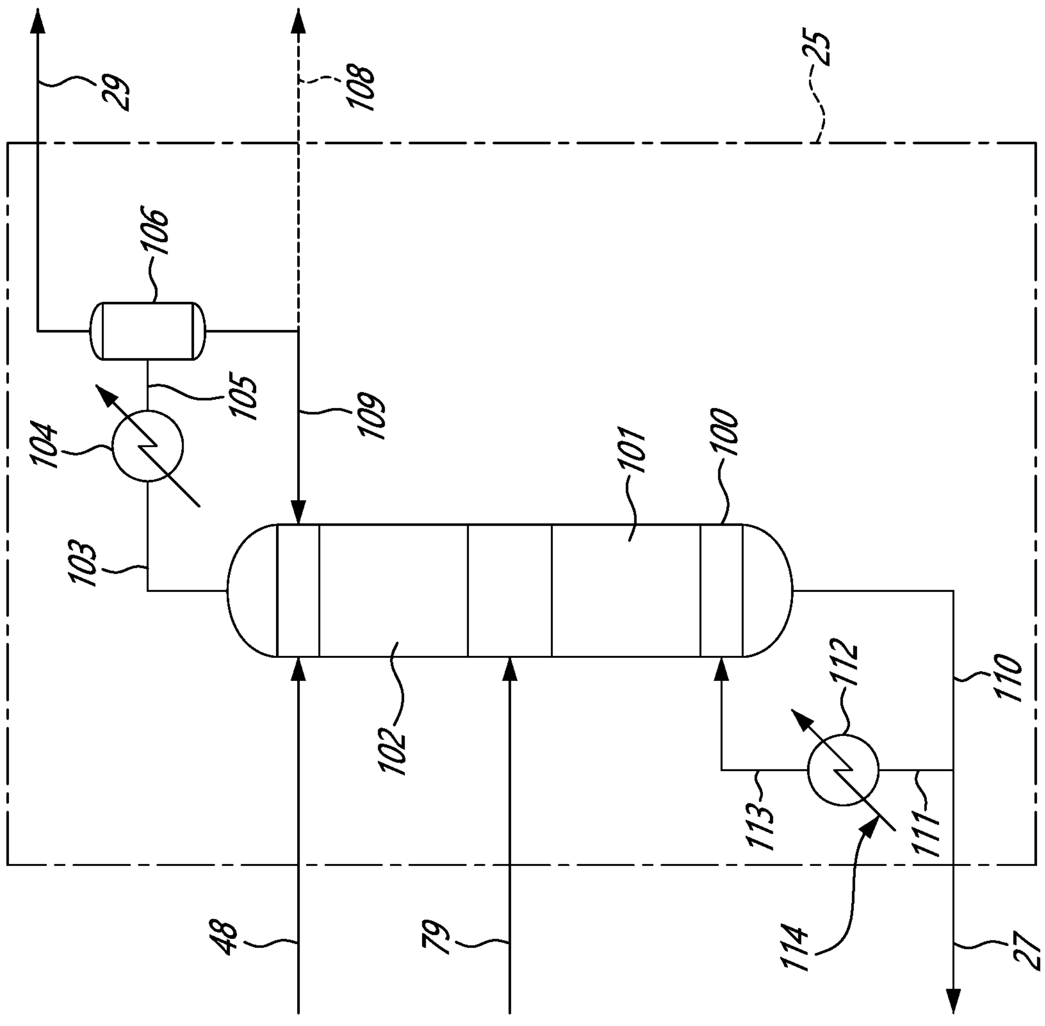
FIG. 6 illustrates a flow chart of the process described herein in accordance to an embodiment, including details of a split loading nitrogen and sulfur species stripping unit, and option to further improve the efficiency of the AGR.

The split loading design option (FIG. 6) of the AGR stripping unit (25) allow to further improve the overall energy efficiency of the overall AGR unit as shown in Table 5 below.

TABLE 5

AGR efficiency improvement with split loading stripper design compared to standard configuration stripper

| | Unit/ Case | Standard Stripper (25) #1 (Note 1) | Split Loading Stripper (100) #2 (Note 1) |
|---|---|---|---|
| Nb of Theoritical Stages (single mass transfer zone) | Nb | 18 | — |
| Nb of Theoritical Stages - Bottom mass transfer zone (101) | Nb | — | 6 |
| Nb of Theoritical Stages - Bottom mass transfer zone (102) | Nb | — | 12 |
| Total Nb of Theoritical Stages in stripper | Nb | 18 | 18 |
| Heat Duty (25) | kW | 2471 | — |
| Heat Duty (52) | kW | — | — |
| Heat Duty (100) | kW | — | 2471 |
| Total Heat duty | kW | 2471 | 2471 |
| AGR H2S removal efficiency | % | >99.9 | >99.9 |
| AGR HCN removal efficiency | % | 98.5 | >99.9 |

(Note 1):
Both cases include the third recirculation loop (46), and thus also the fourth mass transfer zone section 45 and flash steps 53

In the split loading design option, the stripper column (100) has at least 2 mass transfer zone sections (101 and 102). The nitrogen species loaded methanol (48) is fed at the top of the stripper column and above the top mass transfer zone (102), while the sulfur species loaded methanol (79) is fed in the middle of the stripper column (100) in between the top (102) and bottom (101) mass transfer zone sections. Thermal energy (114) is supplied to the stripper column (100) via the stripper reboiler (112), which evaporate a portion (111) of the column bottom product (110) to generate the vapor boil-up (113), which is returned to the bottom of the stripper column (100). The stripper column (100) is also equipped with a condenser (104) which cool and condense the methanol vapor in the column overhead vapor (103). At the outlet of the condenser (104) stream 105 contains the condensed methanol and non-condensable vent gases, which are separated in the reflux drum (106) into the liquid reflux (109) required for the column operation, and the sulfur and/or nitrogen species vent gases (29). The regenerated solvent (27) at the bottom of the stripper column (100) is then recycled, as described earlier, back to the absorber column (12) top mass transfer zone section (18).

In an embodiment, when the scrubbed syngas (10) contain significant concentration of aromatic such as benzene and toluene, a liquid purge (108) may be extracted from the reflux steam (109) to minimise build-up to these aromatic compound in the AGR loops.

In an embodiment, this novel AGR design, can also be integrated with processes incorporating reverse water gas shift (RWGS) unit to convert the recovered $CO_2$ along with the imported $H_2$ to generate additional carbon monoxide prior to the syngas conversion unit, as described in patent application U.S. 63/185,482, the content of which is incorporated herein in its entirety. The additional CO production being mixed with the balance of the clean syngas to generate a boosted CO clean syngas.

In another embodiment, as described in patent application U.S. 63/185,482, the recovered $CO_2$ of this novel AGR design can be recycled back to the carbonaceous feedstock gasification and/or reforming unit to reduce the reformed syngas $H_2$/CO ratio, increase the total CO yield and production, and thus generating a boosted CO scrubbed syngas and a boosted CO clean syngas at the outlet of the AGR.

In both cases, the boosted CO clean syngas is mixed with hydrogen producing a balanced syngas stream, wherein the balanced syngas stream meet the stoichiometric ratio requirement of the syngas conversion unit. Such option being advantageous when the syngas conversion unit can only convert in-situ $H_2$+CO and not $H_2$+$CO_2$ into desired product, for example but not limited to Fischer Tropsch unit or technology using Cobalt based catalyst, or ethanol production technology using the methanol carbonylation pathway While the disclosure has been described with particular reference to the illustrated embodiment, it will be understood that numerous modifications thereto will appear to those skilled in the art. Accordingly, the above description and accompanying drawings should be taken as illustrative and not in a limiting sense. For simplification purpose, several secondary details were omitted, such as pump, heat exchangers, some compressors, etc.

While the disclosure has been described in connection with specific embodiments thereof, it will be understood that it is capable of further modifications and this application is intended to cover any variations, uses, or adaptations and including such departures as come within known or customary practice within the art and as may be applied to the essential features hereinbefore set forth, and as follows in the scope of the appended claims.

What is claimed is:

1. A process for optimizing syngas carbon utilization and syngas purity for subsequent syngas conversion into a downstream syngas conversion unit from a scrubbed syngas source comprising the steps of:

a) feeding a scrubbed syngas into a purification unit comprising at least one absorption unit to partially remove $CO_2$ from said scrubbed syngas, producing a clean syngas stream adjusted to optimal target carbon content and a $CO_2$ rich stream, wherein the purification unit is an acid gas removal unit (AGR), wherein in said AGR, $CO_2$ and sulfur species are absorbed from the scrubbed syngas in said at least one absorption unit using a selective solvent, producing a loaded solvent and a clean syngas stream;

the loaded solvent is withdrawn through at least one recirculation loop;

the loaded solvent is pre-flashed at an intermediate pressure to recover absorbed $H_2$ and CO, producing a $CO_2$ rich stream rich in $H_2$ and CO and a flashed solvent stream;

the flashed solvent is flashed at lower pressure to recover $CO_2$, generating a non-flammable $CO_2$ rich stream and a second flashed solvent; and the second flashed solvent is stripped in a first stripping unit to remove the sulfur species, producing a rich sulfur species stream and a clean solvent which is recycled back into the absorption unit;

b) mixing the clean syngas stream with hydrogen producing a balanced syngas stream, wherein the balanced syngas stream meets a stoichiometric ratio requirement of the syngas conversion unit; and c) feeding said balanced syngas stream in said syngas conversion unit.

2. The process of claim 1, wherein the sulfur species is $H_2S$, COS, $CS_2$, or a combination thereof.

3. The process of claim 1, wherein the at least one absorption unit further removes nitrogen contaminant species and produces an additional nitrogen contaminant rich stream.

4. The process of claim 1, wherein the scrubbed syngas source comprises between 25 to 45 mol % of $H_2$, 30 to 65 mol % of CO and 6 to 40 mol % of $CO_2$ and/or wherein the clean syngas stream composition comprises 30% to 50 mol % $H_2$, 40 to 68 mol % CO and 0 to 25 mol % $CO_2$.

5. The process of claim 1, further comprising a step of recycling the $CO_2$ rich stream for use as inerting gas, exporting said $CO_2$ rich stream for Carbon Capture and Storage (CCS), and/or producing saleable merchant $CO_2$ from said $CO_2$ rich stream.

6. The process of claim 1, wherein a first portion of the loaded solvent is withdrawn through a first recirculation loop and a second portion of the loaded solvent is withdrawn through a second recirculation loop, and where, the first portion of the loaded solvent is pre-flashed at an intermediate pressure recovering the $H_2$ and CO contained in the loaded solvent, producing a first $CO_2$ stream rich in $H_2$ and CO and a first flashed solvent, and the second portion of the loaded solvent is pre-flashed at an intermediate pressure recovering $H_2$ and CO contained in the loaded solvent, producing a second $CO_2$ stream rich in $H_2$ and CO and a second flashed solvent;

the first flashed solvent is flashed at lower pressure generating a non-flammable $CO_2$ rich stream and a clean solvent which is recycled back into the absorption unit;

the first and second $CO_2$ streams rich in $H_2$ and CO are recycled in the scrubbed syngas stream upstream of the absorption unit; and the second solvent is stripped in a first stripping unit to remove sulfur species, producing a rich sulfur species stream and a clean solvent which is recycled back into the absorption unit.

7. The process of claim 1, wherein the selective solvent of the purification unit further removes a sulfur species, and nitrogen species, producing a rich sulfur and nitrogen species stream.

8. The process of claim 7, wherein a first portion of the loaded solvent is withdrawn through a first recirculation loop, a second portion of loaded solvent is withdrawn through a second recirculation loop, and a third portion of loaded solvent is withdrawn through a third recirculation loop where;

the first portion of the loaded solvent is pre-flashed at an intermediate pressure recovering the $H_2$ and CO contained in the loaded solvent, producing a first $CO_2$ stream rich in $H_2$ and CO and a first flashed solvent; and the second portion of the loaded solvent is pre-flashed at an intermediate pressure recovering $H_2$ and CO contained in the loaded solvent, producing a second $CO_2$ stream rich in $H_2$ and CO and a second flashed solvent; and, optionally, the third portion of the loaded solvent is pre-flashed at an intermediate pressure recovering the $H_2$ and CO contained in the loaded solvent, producing a third $CO_2$ stream rich in $H_2$ and CO and a third flashed solvent;

the first flashed solvent is flashed at lower pressure generating a non-flammable $CO_2$ rich stream and a clean solvent which is recycled back into the absorption unit;

the first, second and optional third $CO_2$ streams rich in $H_2$ and CO are recycled in the scrubbed syngas stream upstream of the absorption unit; and the second flashed and third flashed solvents, or unflashed solvents are stripped in a stripping unit to remove the sulfur species, and nitrogen species, producing a rich sulfur and nitrogen species stream and a clean solvent which is recycled back into the absorption unit.

9. The process of claim 1, wherein the non-flammable $CO_2$ rich stream is further used as inerting gas, recovered for Carbon Capture and Storage (CCS) and/or to produce saleable merchant $CO_2$.

10. The process of claim 1, further comprising treating the clean syngas stream with at least one solid adsorbent bed before or after mixing the clean syngas stream with hydrogen.

11. The process of claim 1, wherein an $H_2S$ concentration in the clean syngas stream is adjusted to achieve a specific desired concentration, to meet the requirement of the downstream syngas conversion unit; while achieving low level of HCN and/or $NH_3$ concentration.

12. The process of claim 1, wherein the hydrogen mixed with the clean syngas is imported from an external source.

13. The process of claim 1, wherein the purification unit comprises chilled methanol as a solvent.

14. The process of claim 1, wherein the balanced syngas stream meets the stoichiometric ratio requirement of the syngas conversion unit to produce fuel, a chemical, or a Fischer Tropsch product.

15. The process of claim 1, wherein the scrubbed syngas is from a gasification and/or reforming of a carbonaceous material.

16. The process of claim 12, further comprising admixing an external source of $CO_2$ or $CO_2$ input from another process effluent into the clean syngas stream along with the external source of hydrogen to produce a balanced syngas further boosted in carbon that meets the stoichiometric ratio of the desired end product, thus further increasing the production of the desired end product.

17. The process of claim 1, further comprising a reverse water gas shift (RWGS) unit to convert a portion of the $CO_2$ along with a portion of the hydrogen to generate additional carbon monoxide prior to the syngas conversion unit.

18. The process of claim 1, wherein $CO_2$ is recycled back to a carbonaceous feedstock gasification and/or reforming unit to reduce the scrubbed syngas source $H_2$/CO ratio, increasing a total CO yield and production, and generating a boosted CO scrubbed syngas and a boosted CO clean syngas.

19. The process of claim 1, wherein the purification unit comprises a stripping unit including a split loading stripper column with at least a top and bottom mass transfer zone sections, where nitrogen species loaded methanol is fed at the top of the stripper column and above the top mass transfer zone, while the sulfur species loaded methanol is fed in the middle of the stripper column in between the top and bottom mass transfer zone sections.

* * * * *